(12) United States Patent
Kim et al.

(10) Patent No.: US 7,561,496 B2
(45) Date of Patent: Jul. 14, 2009

(54) RECORDING MEDIUM WITH COPY PROTECTION INFORMATION AND APPARATUS/METHOD FOR FORMING, RECORDING, REPRODUCING, AND RESTRICTING REPRODUCTION OF THE RECORDING MEDIUM

(75) Inventors: Jin Yong Kim, Kyunggi-do (KR); Jung Bae Park, Anyang-si (KR)

(73) Assignee: LG Electronics Inc., Seoul (KR)

( * ) Notice: Subject to any disclaimer, the term of this patent is extended or adjusted under 35 U.S.C. 154(b) by 623 days.

(21) Appl. No.: 10/849,050

(22) Filed: May 20, 2004

(65) Prior Publication Data

US 2004/0246854 A1    Dec. 9, 2004

(51) Int. Cl.
*G11B 7/00* (2006.01)
(52) U.S. Cl. .................. 369/44.13; 369/275.3; 369/278
(58) Field of Classification Search .............. 369/275.4, 369/53.21, 44.13, 275.3, 59.24, 53.22, 124.05
See application file for complete search history.

(56) References Cited

U.S. PATENT DOCUMENTS

| | | | |
|---|---|---|---|
| 5,513,260 A | 4/1996 | Ryan | |
| 5,809,006 A | 9/1998 | Davis et al. | |
| 5,848,050 A | 12/1998 | Nagasawa et al. | |
| 6,108,296 A | 8/2000 | Kajiyama et al. | |
| 6,847,599 B2* | 1/2005 | Hayashi | 369/53.22 |
| 6,965,551 B2* | 11/2005 | Tomita | 369/53.3 |
| 7,006,419 B2* | 2/2006 | Yokoi | 369/59.11 |
| 7,151,729 B1 | 12/2006 | Park et al. | |
| 7,266,074 B2 | 9/2007 | Kim et al. | |
| 2002/0021635 A1 | 2/2002 | Park et al. | |
| 2003/0067858 A1* | 4/2003 | Kuroda et al. | 369/59.24 |
| 2003/0227853 A1 | 12/2003 | Kim et al. | |
| 2004/0001414 A1 | 1/2004 | Kadowaki et al. | |
| 2004/0120247 A1* | 6/2004 | Lee et al. | 369/275.3 |
| 2004/0165494 A1 | 8/2004 | Suh et al. | |
| 2004/0168074 A1 | 8/2004 | Suh et al. | |
| 2004/0168075 A1 | 8/2004 | Suh et al. | |
| 2004/0223427 A1 | 11/2004 | Kim et al. | |
| 2004/0233804 A1 | 11/2004 | Suh et al. | |
| 2004/0233809 A1 | 11/2004 | Suh et al. | |
| 2004/0252603 A1 | 12/2004 | Suh et al. | |
| 2005/0063261 A1 | 3/2005 | Kim et al. | |

(Continued)

FOREIGN PATENT DOCUMENTS

EP     703576 A1 *  3/1996

(Continued)

OTHER PUBLICATIONS

Search Report issued Sep. 9, 2004 in International Patent Application No. PCT/KR2004/001196.

(Continued)

*Primary Examiner*—Joseph Feild
*Assistant Examiner*—Tawfik Goma
(74) *Attorney, Agent, or Firm*—Harness, Dickey & Pierce, P.L.C.

(57) ABSTRACT

A recording medium, such as a high-density and/or read-only recording medium, such as BD-ROM, which includes copy protection information for preventing illegal copying of the contents recorded on the recording medium, and to methods and apparatuses for forming, recording, and reproducing data on the recording medium.

19 Claims, 8 Drawing Sheets

U.S. PATENT DOCUMENTS

| | | |
|---|---|---|
| 2005/0105432 A1 | 5/2005 | Suh et al. |
| 2005/0209971 A1 | 9/2005 | Suh et al. |
| 2006/0143480 A1 | 6/2006 | Suh et al. |
| 2006/0156038 A1 | 7/2006 | Suh et al. |
| 2006/0164944 A1 | 7/2006 | Suh et al. |
| 2006/0262712 A1 | 11/2006 | Suh et al. |
| 2008/0043607 A1 | 2/2008 | Suh et al. |
| 2008/0056092 A1 | 3/2008 | Kim et al. |

FOREIGN PATENT DOCUMENTS

| | | |
|---|---|---|
| EP | 0 936 610 A2 | 8/1999 |
| EP | 997899 A2 * | 5/2000 |
| JP | 2001-076141 | 3/2001 |
| WO | WO 2004/075187 A1 | 9/2004 |

OTHER PUBLICATIONS

Office Action issued Jun. 23, 2008 by the USPTO in U.S. Appl. No. 10/849,049.

* cited by examiner

Biphase modulated HFM groove

US 7,561,496 B2

RECORDING MEDIUM WITH COPY PROTECTION INFORMATION AND APPARATUS/METHOD FOR FORMING, RECORDING, REPRODUCING, AND RESTRICTING REPRODUCTION OF THE RECORDING MEDIUM

CROSS-REFERENCE TO RELATED APPLICATIONS

This U.S. nonprovisional patent application claims priority under 35 U.S.C. § 119 of Korean Patent Application 10-2003-0031912 filed on May 20, 2003, the entire contents of which are hereby incorporated by reference.

BACKGROUND OF THE INVENTION

1. Field of the Invention

The present invention relates to a recording medium such as high density optical recording medium, i.e., BD-ROM (Blu-ray Disc ROM), which includes copy protection information and an apparatus and methods for forming, recording, reproducing, and restricting reproduction of illegally duplicated recording media.

2. Description of the Related Art

Recently, standardization of Blu-ray Disc Rewritable (BD-RE), which is a new high-density rewritable optical disc capable of recording large capacity high-quality video and audio data, is in progress. BD-RE related products are expected to be available on the market in the near future.

FIG. 1A depicts the structure of a BD-RE, wherein a clamping area, a burst cutting area (BCA), a transition area, a lead-in area, a data area, and lead-out area are disposed in order as shown.

The lead-in area includes several pre-assigned areas such as a first guard (Guard 1) area, a permanent information & control data (PIC) area, a second guard (Guard 2) area, a second (Info 2) and a first information (Info 1) area, and an optimum power calibration (OPC) area. The Guard 1 area and the PIC area are pre-recorded areas in which some initial data is pre-recorded, whereas the other areas of the lead-in area, the data area, and the lead-out areas are all rewritable areas.

The second guard area may be used as a buffer zone for the changeover from the embossed HFM area to the Rewritable area.

The OPC area may be reserved for testing and OPC procedures.

In the PIC area, important permanent disc information is encoded in a wobbled groove by high frequency modulation (HFM). As depicted in FIG. 2, the wobble-shaped data encoding is performed by bi-phase modulation. In this modulation method, a bit with value 0 may be represented by a transition at the start of the bit cell and a bit with value 1 may be represented by a transition at the start and in the middle of the bit cell. The modulated bits may be recorded on the disc by a deviation of the groove from its average centerline as indicated in FIG. 2. The length of each bit cell may be 36T, where T corresponds to the length of a channel bit in the rewritable data areas.

Also, a read-only Blu-ray Disc (BD-ROM) is also under development along with the development of BD-RE. A BD-ROM may include an inner area, a clamping area, a transition area, an information area, and a rim area, as shown in FIG. 3.

The main data of an audio/video (A/V) stream is recorded in the data zone belonging to the information area in an encrypted format using copy protection information (CPI) to help prevent an illegal copy.

Various types of disc information, such as a disc type, may be recorded in the PIC zone belonging to the information area. Where the main data stored in the data zone is encrypted, the CPI for decrypting the data is also recorded in the PIC zone.

Once an optical disc is loaded into an optical disc reproducing apparatus, the optical disc reproducing apparatus detects the CPI recorded in the PIC zone and then decrypts the main data recorded in the data zone, if the main data is stored in an encrypted format.

The CPI protects the contents recorded on the read-only recording medium; hence it is recorded in such a way that it may not be copied to another medium by data copy operations.

SUMMARY OF THE INVENTION

In exemplary embodiments, the present invention is directed to a recording medium, such as a high-density and/or read-only recording medium, such as BD-ROM, which includes copy protection information for preventing illegal copying of the contents recorded on the recording medium, and to methods and apparatuses for forming, recording, and reproducing data on the recording medium.

In exemplary embodiments, the present invention is directed to a recording medium, such as a high-density and/or read-only recording medium, such as BD-ROM, wherein the copy protection information is not detectable by conventional methods for detecting recorded signals, and to methods and apparatuses for forming, recording, and reproducing data on the recording medium.

In exemplary embodiments, the present invention is directed to a recording medium, such as a high-density and/or read-only recording medium, such as BD-ROM, which includes encoded copy protection information for preventing illegal copying of contents, and to methods and apparatuses for forming, recording, and reproducing data on the recording medium.

In exemplary embodiments, the present invention is directed to a recording medium, such as a high-density and/or read-only recording medium, such as BD-ROM, which includes copy protection information encoded in phase wobbled (or zigzagged) pits, and to methods and apparatuses for forming, recording, and reproducing data on the recording medium.

In exemplary embodiments, the present invention is directed to a recording medium, such as a high-density and/or read-only recording medium, such as BD-ROM, which includes data recorded as pits formed along tracks, where a frame sync signal or other signal indicative of the start of a data frame is encoded in straight pits and a segment of data positioned after the frame sync signal or other signal indicative of the start of a data frame is encoded in wobbled (or zigzagged) pits shifted from the track center to the left and/or right, and to methods and apparatuses for forming, recording, and reproducing data on the recording medium.

In exemplary embodiments, the present invention is directed to a recording medium, such as a high-density and/or read-only recording medium, such as BD-ROM, wherein the frame sync signal indicative of the start of a data frame is encoded in straight pits and a segment of data positioned after the frame sync signal is encoded in wobbled (or zigzagged) pits shifted from the track center to the left and/or right, and to methods and apparatuses for forming, recording, and reproducing data on the recording medium.

In exemplary embodiments, the present invention is directed to a recording medium, such as a high-density and/or read-only recording medium, such as BD-ROM, wherein data is encoded in wobbled pits formed on the recording medium, a frame sync signal indicative of the start of a data frame is detectable from an RF reproduced signal created by pits formed along tracks existing on the recording medium, one or more push-pull signals created by the difference of beams reflected by left and right portions around the track center are integrated for a given time interval, a value of an output data bit is based on the integrated value, and to methods and apparatuses for forming, recording, and reproducing data on the recording medium.

In exemplary embodiments, the present invention is directed to a recording medium, such as a high-density and/or read-only recording medium, such as BD-ROM, wherein data is encoded in wobbled pits formed on the recording medium, a frame sync signal or other signal indicative of the start of a data frame is detectable from an RF reproduced signal created by pits formed along tracks existing on the recording medium, one or more push-pull signals created by the difference of beams reflected by left and right portions around the track center are generated, a timing signal indicative of an integration interval and whether to invert the sign of the push-pull signal is generated, the push-pull signal is integrated based on the timing signal, and a value of a data bit is output based on the integrated value, and to methods and apparatuses for forming, recording, and reproducing data on the recording medium.

In exemplary embodiments, the present invention is directed to a recording medium including recorded data, the recording medium including an information area, the information area including a first region for the recorded data and a second region for copy protection information for use in decrypting the recorded data, said second region including a data unit, the data unit including a first portion having first data encoded in straight type and second portion having said copy protection information encoded in wobbled type by bi-phase modulation.

In other exemplary embodiments, the present invention is directed to a method of forming copy protection information on a recording medium, the method including forming a recordable area for storing recorded data and forming an area on the recording medium for storing copy protection information for use in decrypting the recorded data, the area including a data unit, the data unit including a first portion having first data encoded in straight type and a second portion having said copy protection information encoded in wobbled type by bi-phase modulation.

In other exemplary embodiments, the present invention is directed to a method of reproducing data from a recording medium, the method including detecting copy protection information for use in decrypting the data, to reproduce the data, wherein said copy protection information is recorded in a region of the recording medium, the region including a data frame, the data frame including a first portion having first data encoded in straight type and a second portion having said copy protection information encoded in wobbled type by bi-phase modulation and controlling a decryption of data recorded on data area based on the detected copy protection information.

In other exemplary embodiments, the present invention is directed to a method of recording data on a recording medium, the method including generating the copy protection information for use in decrypting the data, encoding the copy protection information as a data unit, the data unit including a first portion having first data encoded in straight type and a second portion having said copy protection information encoded in wobbled type by bi-phase modulation, and recording the copy protection information on an specific area of the recording medium.

In other exemplary embodiments, the present invention is directed to a apparatus for reproducing data from a recording medium, said apparatus utilizing copy protection information for use in decrypting the data, to reproduce the data, said apparatus comprising: a detector detecting the copy protection information recorded on the recording medium, wherein said copy protection information is recorded in a region of the recording medium, the region including a data frame, the data frame including a first portion having first data encoded in straight type and a second portion having said copy protection information encoded in wobbled type by bi-phase modulation; and a signal processor for decrypting the data utilizing the copy protection information.

BRIEF DESCRIPTION OF THE DRAWINGS

The accompanying drawings, which are included to provide a further understanding of the invention, illustrate exemplary embodiments of the invention, and together with the description, serve to explain the principles of the present invention.

In the drawings.

DETAILED DESCRIPTION OF EXEMPLARY EMBODIMENTS

In order that the invention may be fully understood, exemplary embodiments thereof will now be described with reference to the accompanying drawings.

Figure 1:
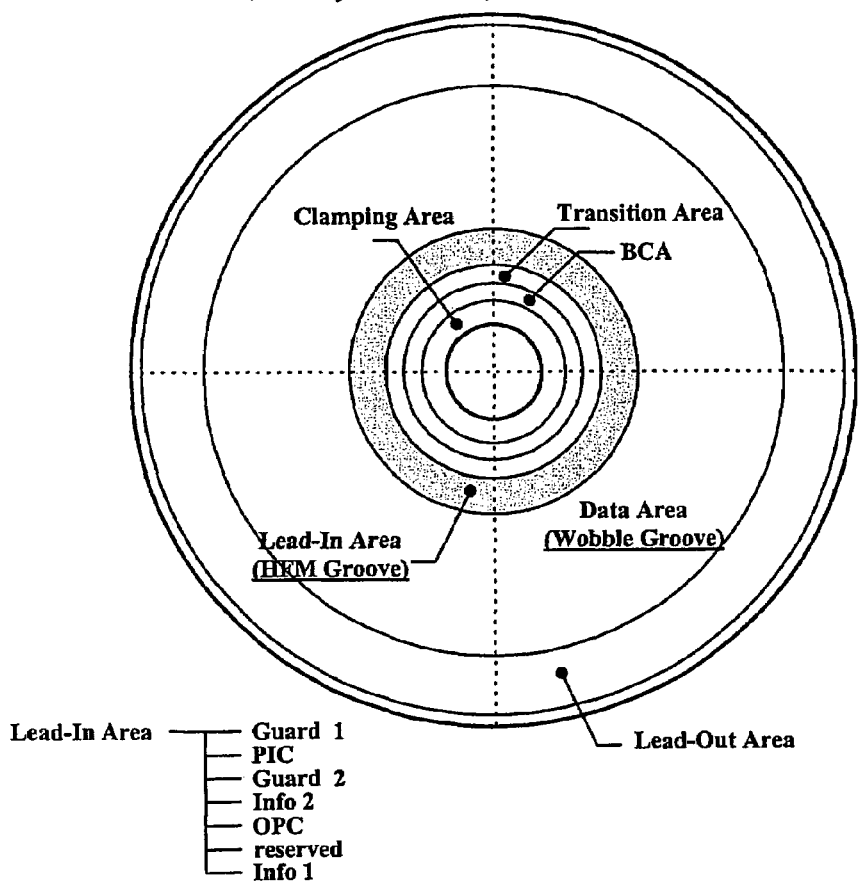
FIG. 1 illustrates the structure of a conventional BD-RE.
Figure 2:
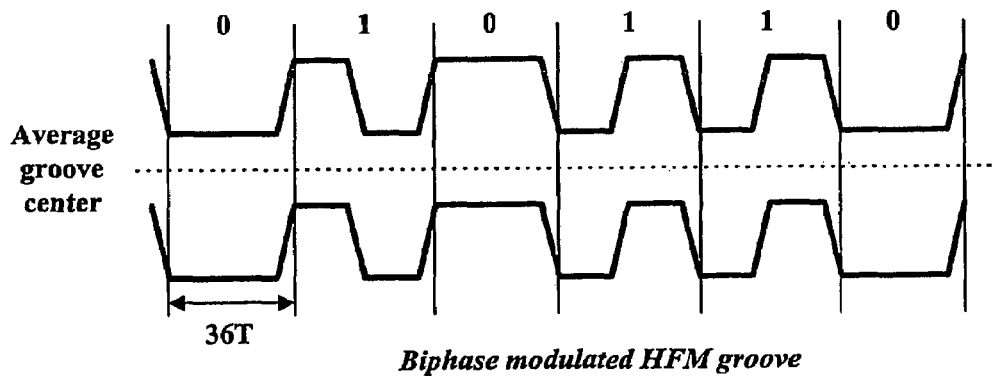
FIG. 2 illustrates a high-frequency modulated (HFM) groove formed in the PIC area of a BD-RE.
Figure 3:
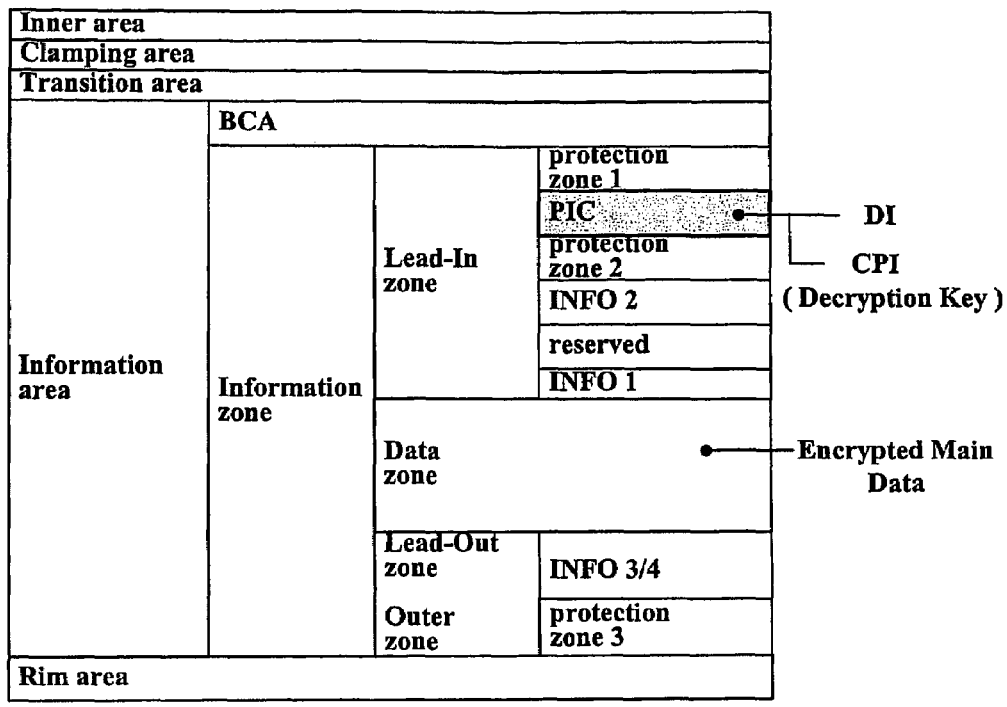
FIG. 3 illustrates areas assigned to a BD-ROM.

A BD-ROM in accordance with an exemplary embodiment of the invention has a disc structure including an inner area, a clamping area, a transition area, an information area, and a rim area, as shown in FIG. 3.

Figure 4:
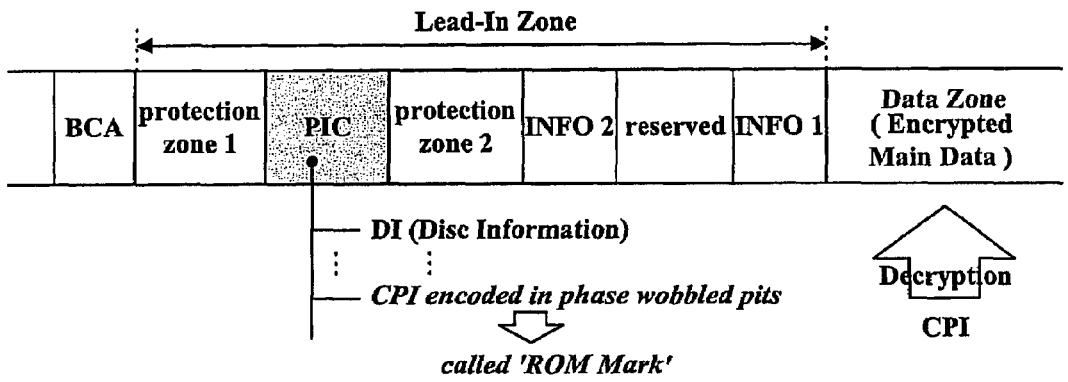
FIG. 4 illustrates an exemplary embodiment of the copy protection information recorded in the PIC zone of a BD-ROM.

As illustrated in FIG. 4, general disc information and the copy protection information (CPI) for decrypting main data recorded in the data zone may be recorded in the PIC zone. The copy protection information (CPI) may also be referred to as the 'ROM mark'.

The CPI may be encoded in wobbled pits formed along tracks of the disc so that the CPI may not be detected by conventional RF signal detecting methods for detecting data encoded in straight pits.

Figure 5:
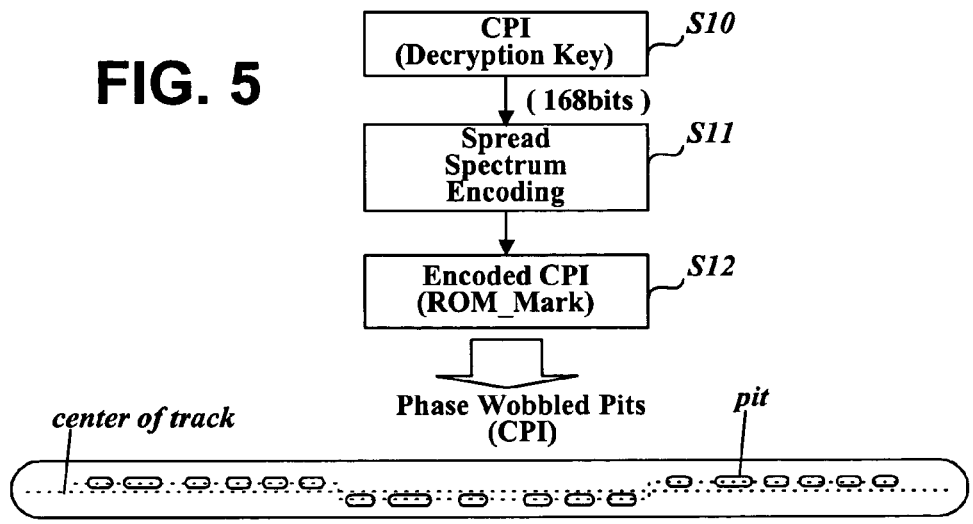
FIG. 5 illustrates the process of encoding the copy protection information in wobbled pits in an exemplary embodiment of the present invention.

FIG. 5 illustrates an exemplary process of encoding the CPI in wobbled pits. The CPI, which may be a decryption key of size 168 bits, is created in the middle of authoring a BD-ROM (S10). The created CPI may be spread spectrum encoded (S11) and then encoded in wobbled pits according to the encoded data bits (S12).

The pit pattern data itself may be a disc control information in the PIC zone, such as a disc type, disc size/version, and channel bit length and so on.

Figure 6:
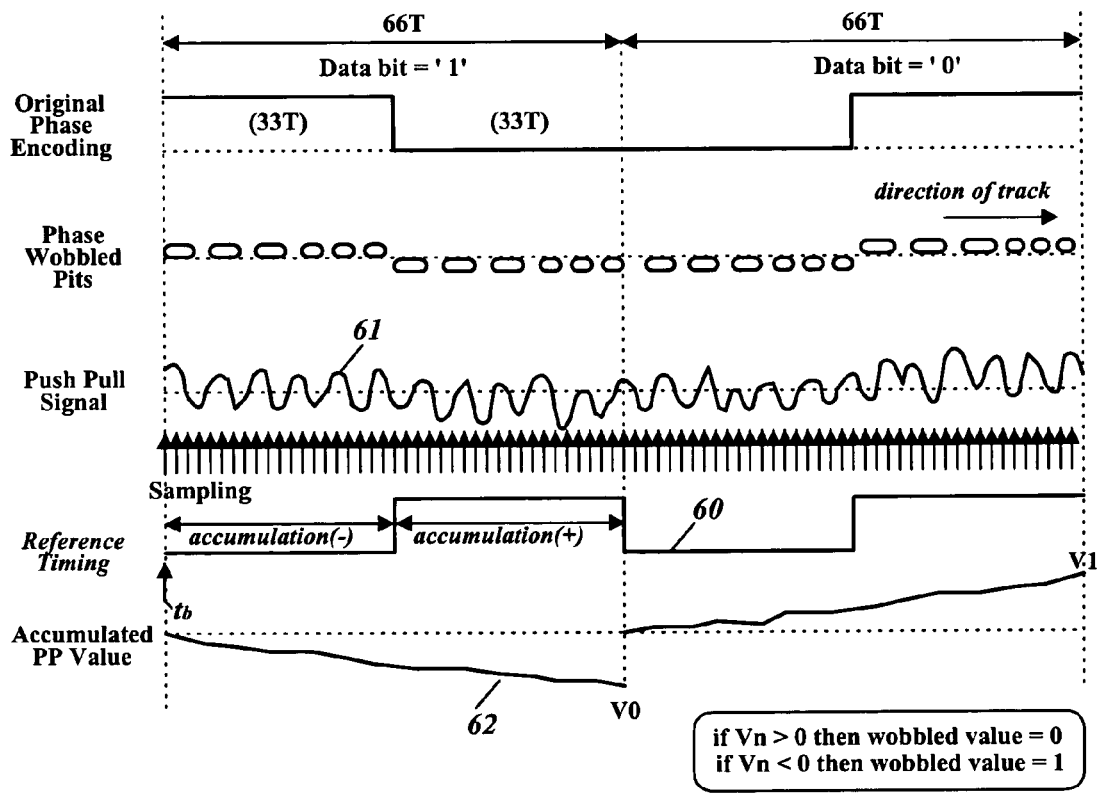
FIG. 6 illustrates a phase wobbled pit train in which data bits are encoded and the process of detecting the data bits in an exemplary embodiment of the present invention.

FIG. 6 illustrates an exemplary phase wobbled pit train in which data bits are encoded and an exemplary process of detecting the data bits.

In the exemplary embodiment shown in FIG. 6, a data bit of the CPI is encoded in a train of pits having a length corresponding to 66T, wherein the pits are shifted from the track center to the left or right and the shifted phase is reversed at the point corresponding to 33T, that is, in the middle of the 66T-long pit train. The data bit encoded in the wobbled pit train can be detected by a push-pull signal created by the pit train.

Since the CPI encoded in phase wobbled pits cannot be detected by conventional RF detecting methods, the security of the CPI is enhanced. An exemplary method for detecting data bits encoded in phase wobbled pits will be described in detail after an exemplary recording format of phase wobbled pit trains is explained.

Figure 7:
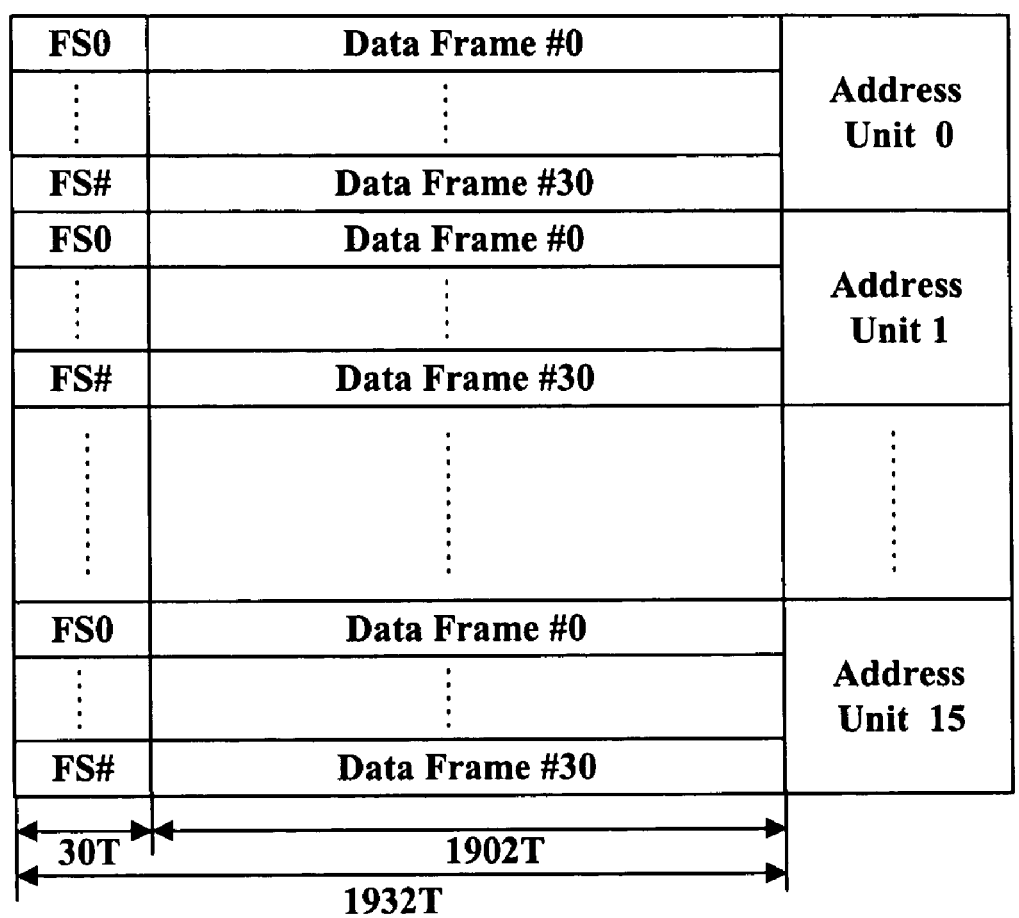
FIG. 7 illustrates the data structure of a physical cluster of a BD-ROM in an exemplary embodiment of the present invention.

FIG. 7 illustrates an exemplary logical recording format of the BD-ROM. A physical cluster, which is the basic data unit of the BD-ROM, may have size of 64 KB and may include 16 address units. Each address unit may further include 31 data frames (Data Frame #0~Data Frame #30) each of which may contain a leading frame sync signal.

A frame sync signal may have a length corresponding to 30T and a data frame may have a length corresponding to 1,902T.

Figure 8:
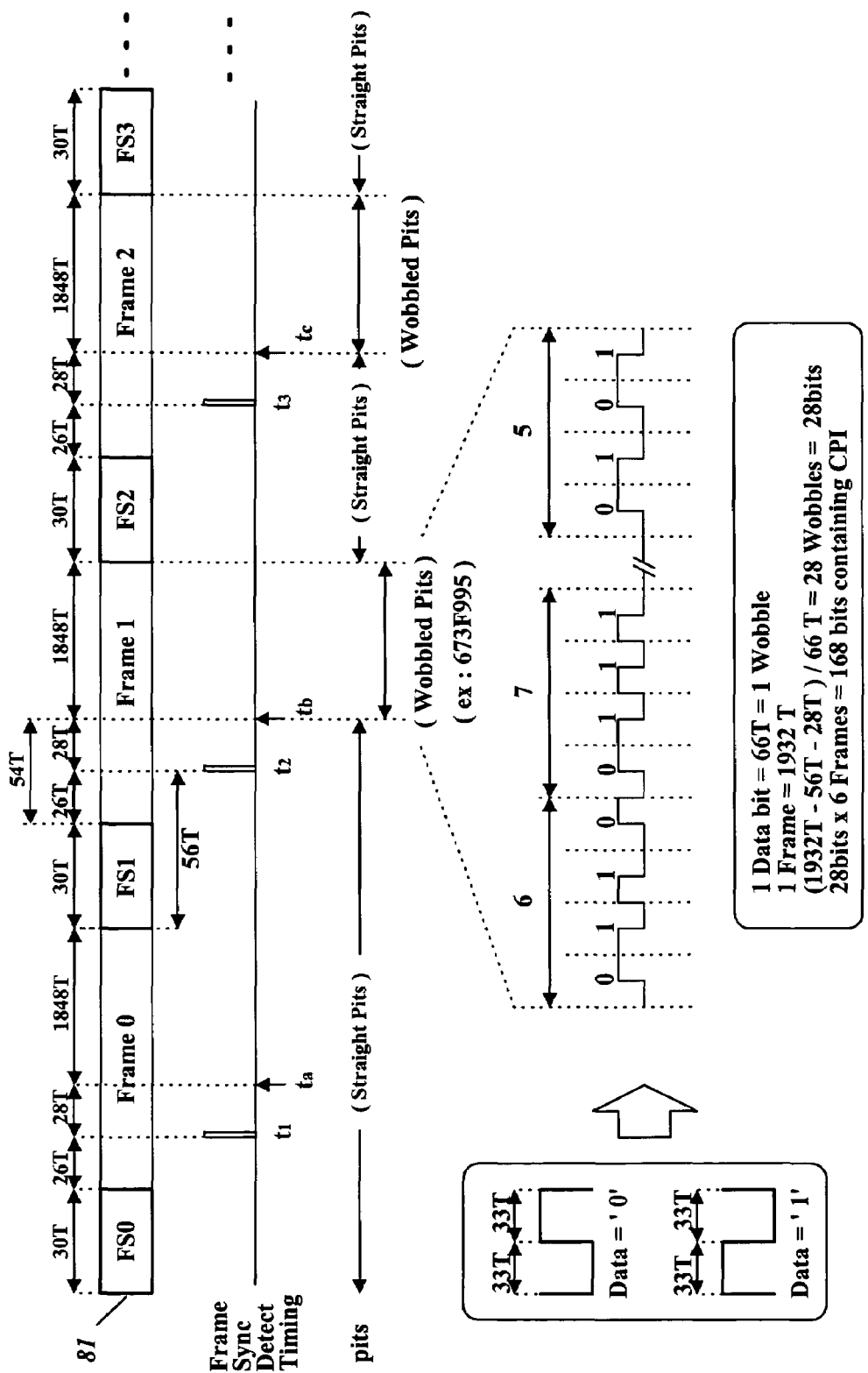
FIGS. 8 to 10 illustrate several exemplary embodiments of encoding the copy protection information in wobbled pits.

FIG. 8 illustrates an exemplary embodiment of the copy protection information encoded in wobbled pits according to the exemplary recording format depicted in FIG. 7.

As set forth above, a data frame may have a length corresponding to 1,902T (1,932T if the frame sync signal is included). If a data bit is encoded in 66T-long phase wobbled pits, 28-bit data can be recorded in a data frame with a remaining length corresponding to 54T (=1902−28*66).

As a result, a data frame may include 1,848T-long phase wobbled pits and 54T-long straight pits.

If the CPI is 168 bits, 6 data frames are needed for storing the CPI because a data frame contains 7 nibbles (=28 bits). In FIG. 8, the CPI is divided into 6 chunks of 28 bits and the divided 6 chunks are recorded in 6 data frames from Frame #1 to Frame #6, one chunk being contained in one data frame. In FIG. 8, for example, a value of '673F995' is encoded in phase wobbled pits of Frame #1.

In other exemplary embodiments, a pit train for encoding a data bit may have a length other than 66T.

Figure 9:
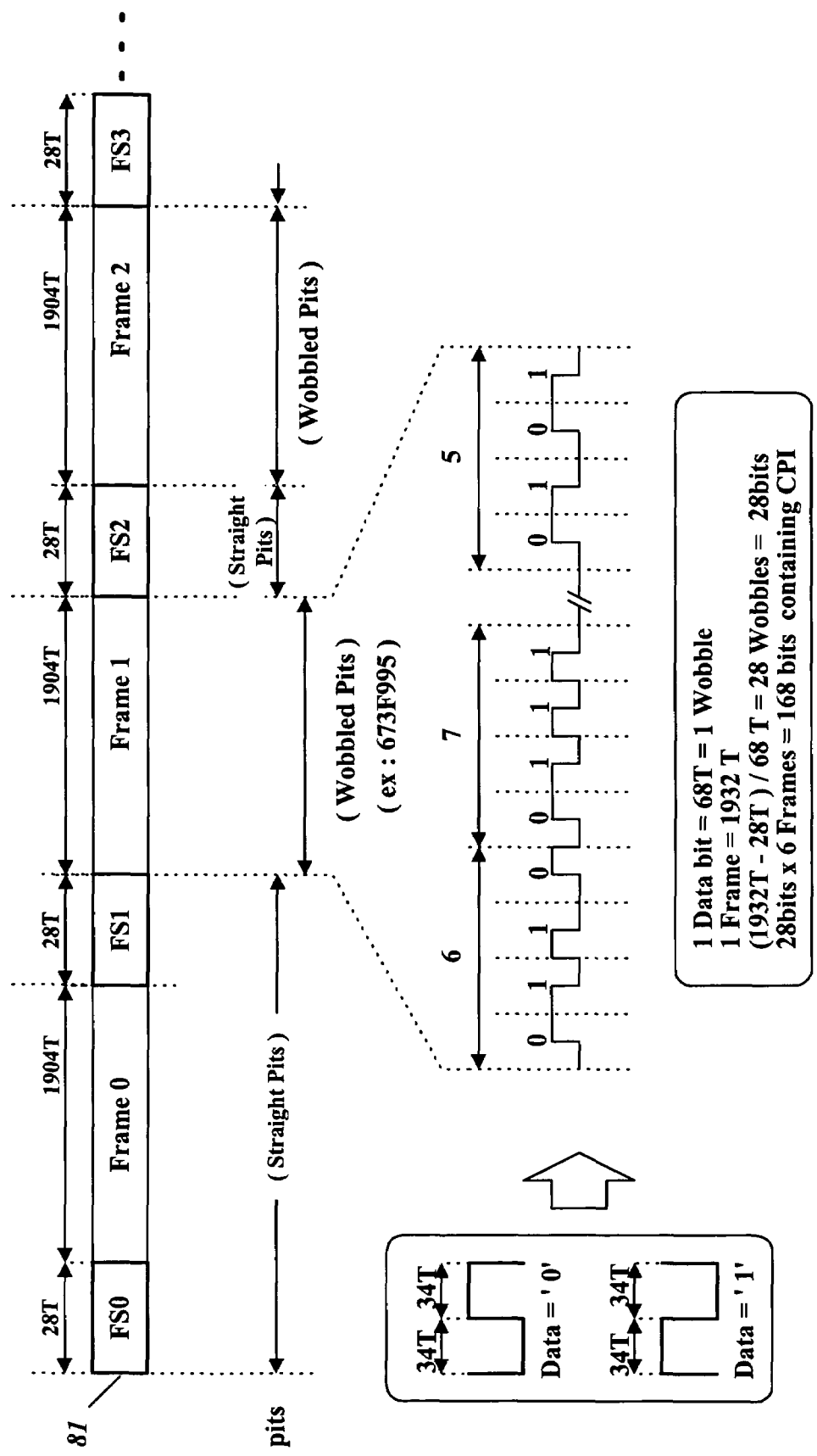

If a data bit is encoded in a train of wobbled pits of a length corresponding to 68T, a 1,904T-long pit train is needed for encoding 28-bit data. In exemplary embodiments, therefore, the length of the frame sync signal should be reduced to 28T. FIG. 9 illustrates an exemplary embodiment according to this format.

In this exemplary embodiment, however, the frame sync signal is shortened, which may lead to less reliable frame sync detection. In another exemplary embodiment, the size of data recorded in a data frame is reduced to 24 bits without shortening the frame sync signal.

Figure 10:
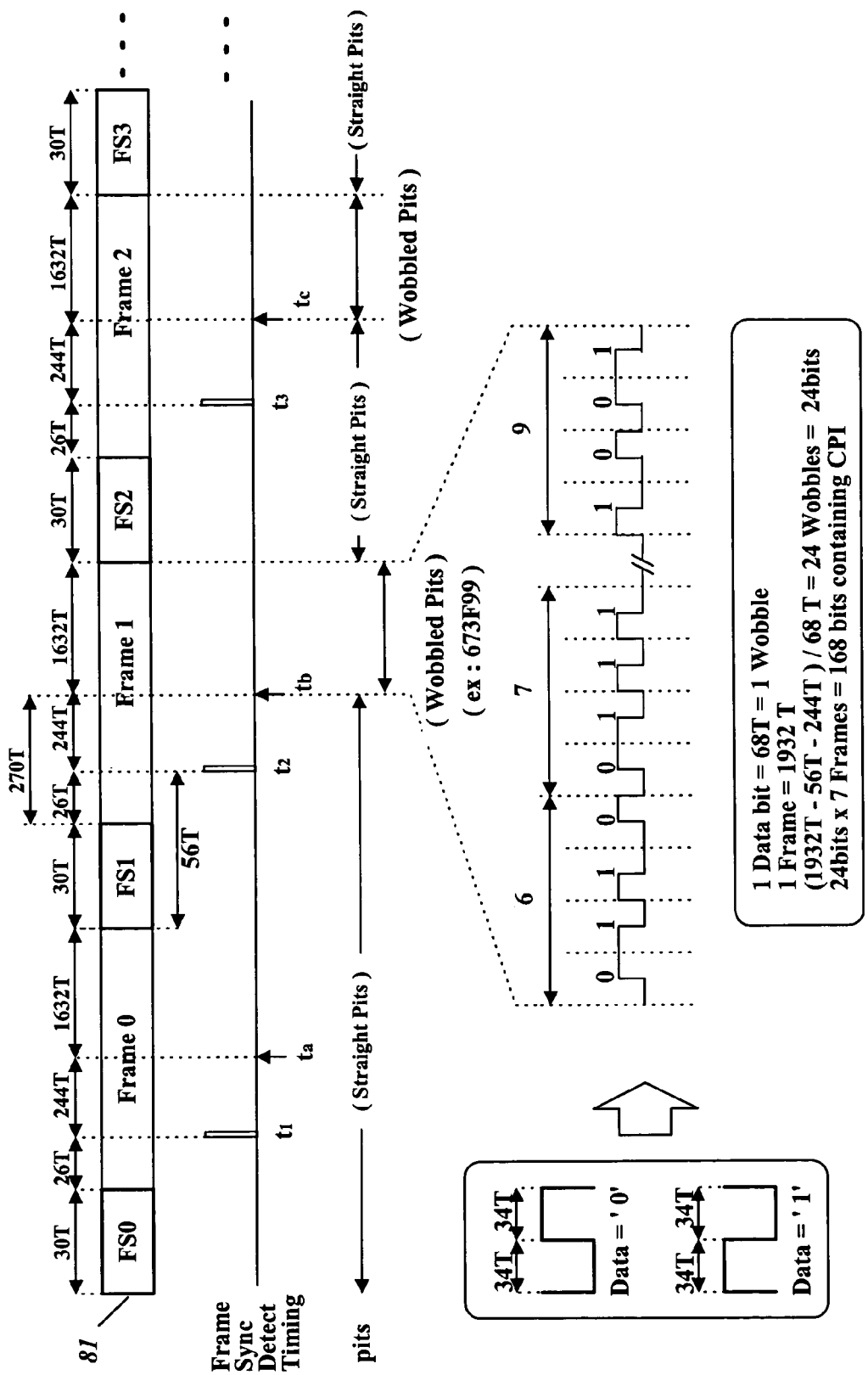

According to this exemplary format, a train of wobbled pits of length 1,632T (=24*68T) can encode 24-bit data and thus a length corresponding to 270T remains after 24-bit data is recorded in a data frame, which is illustrated in FIG. 10. In this exemplary embodiment, CPI of size 168 bits is recorded in 7 data frames.

Since the CPI can be recorded in one address unit in all the aforementioned exemplary embodiments, the CPI can be repeatedly recorded in more than two address units or can be recorded in one address unit more than twice.

An exemplary method for detecting data encoded in phase wobbled pits will be described below in conjunction with FIG. 11.

Figure 11:
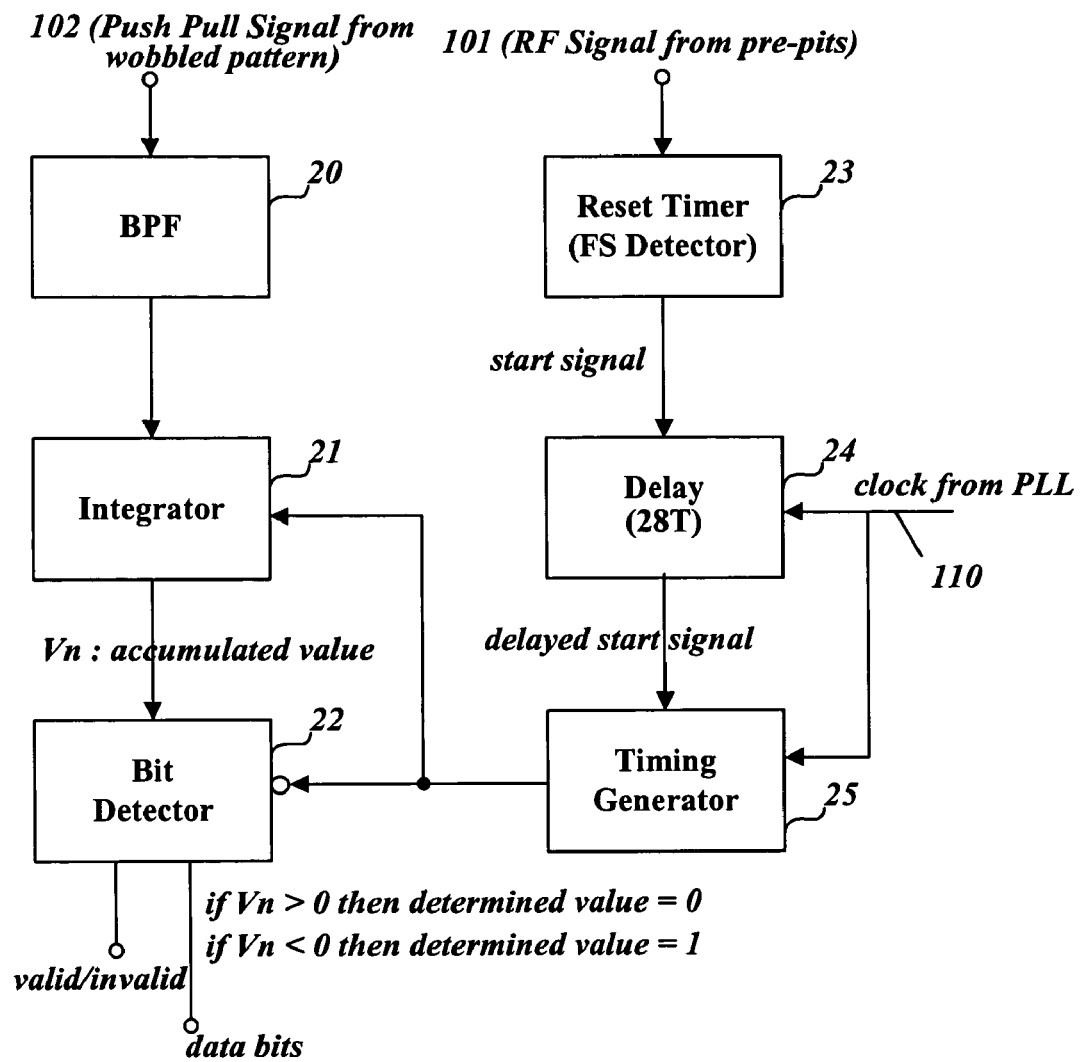
FIG. 11 illustrates a block diagram of an apparatus for detecting data encoded in phase wobbled pits in accordance with an exemplary embodiment of the invention.

FIG. 11 illustrates a block diagram of an apparatus for detecting data encoded in phase wobbled pits in accordance with an exemplary embodiment of the invention.

The apparatus includes a band-pass filter 20 for only passing the frequency components of the push-pull signal created by the wobbled pits, an integrator 21 for sampling and accumulating the push-pull signal, a bit detector 22 for detecting data bits from the output of the integrator 21, a reset timer 23 for detecting frame sync from the RF signal created by pre-pits and for generating a start signal on detecting a frame sync signal, a delay 24 for delaying the start signal by a prescribed time duration, and a timing generator 25 for generating a timing signal on the basis of a clock signal which is provided by an external PLL and synchronized with the reproduced signal.

If the apparatus is employed to detect the data recorded according to the exemplary format illustrated in FIG. 8, the delay 24 delays a start signal received from the reset timer 23 by 28T on the basis of the PLL clock 110. Upon receiving the delayed start signal, the timing generator 25 generates the square wave signal 60 depicted in FIG. 6, the level of which is inverted at intervals of 33T on the basis of the PLL clock 110.

If the apparatus detects the data recorded according to the exemplary format illustrated in FIG. 10, the delay 24 delays a start signal received from the reset timer 23 by 244T on the basis of the PLL clock 110 and the timing generator 25 generates a square signal the level of which is inverted at intervals of 34T.

If a BD-ROM having the exemplary recording format illustrated in FIG. 8 is loaded into the exemplary apparatus and signals from tracks are detected, the RF signal 101, which is the sum of the signals from four photo diodes, is applied to the reset timer 23 and the push-pull signal 102, which is the difference between left and right portions of the signals from the photo diodes, is applied to the band-pass filter 20.

Because the RF signal 101 includes data frames 81 depicted in FIG. 8, the reset timer 23 detects frame sync from the RF signal and outputs a start signal to the delay 24 whenever a frame sync signal is detected. It takes 26T for the reset timer 23 to detect a frame sync signal from the RF signal, which means that the delay 24 receives a start signal from the reset timer 23 with a time delay of 26T (t1, t2, t3, . . . in FIG. 8).

Receiving the start signal, the delay 24 delays the start signal again by 28T and outputs the 28T-delayed start signal to the timing generator 25. At this point (ta, tb, tc . . . in FIG. 8), phase wobbled pits are switched to straight pits if phase wobbled pits exist on the disc.

The timing generator 25 begins to count the PLL clock 110 the moment and generates the square wave timing signal 60 in FIG. 6 the level of which is inverted at intervals of 33T.

The band-pass filter 20 filters the push-pull signal 102 to reject noises contained in the push-pull signal and outputs the band-pass filtered signal to the integrator 21. The input to the integrator 21 is similar to the signal 61 shown in FIG. 6, the DC level of which varies slowly according to the shifted direction of the wobbled pits.

The integrator 21 samples the push-pull signal at constant intervals and accumulates the sampled values. If the level of the timing signal 60 is '0' when a sampled value is to be added, the sign of the sampled value is inverted before it is added. In other words, a positive value is converted into a negative value with the same magnitude and vice versa.

The signal corresponding to the accumulated value is outputted to the bit detector 22. The signal outputted from the integrator 21 is similar to the waveform 62 shown in FIG. 6.

The bit detector 22 determines the value of a data bit by the sign of the accumulated value corresponding to the data bit. If the accumulated value is a positive number having a magnitude exceeding a preset threshold level when the level of the timing signal 60 changes from '1' to '0', the data bit is considered '0'. If the accumulated value is a negative number having a magnitude exceeding a preset threshold level, the data bit is considered '1'.

If the magnitude of an accumulated value is less than the preset threshold level in each case, the push-pull signal has likely been created, not by wobbled pits, but by straight pits and therefore the bit detector 22 generates a signal indicating that the data bit is invalid When the level of the timing signal 60 changes from '1' to '0', the integrator 21 resets the accumulated value to zero and starts a new sampling and accumulating process.

In this exemplary embodiment, the sampled values are accumulated in such a way that the sign of a sampled value is inverted before the sampled value is added while the level of the timing signal 60 is '0'. The accumulation method is not unique and depends on detecting circuitry and phase encoding methods.

The CPI, which is encoded in phase wobbled pits in order not to be detected by the RF signal, can be detected by the exemplary method described above.

The method and apparatus for recording/detecting copy protection information on/from a high-density read-only optical disc in accordance with exemplary embodiments of the present invention makes it difficult to detect the recorded copy protection information, thereby preventing illegal copying of the contents contained in the optical disc to other media.

Although certain specific exemplary embodiments of the present invention have been disclosed, it is noted that the present invention may be embodied in other forms without departing from the spirit or essential characteristics thereof. The present embodiments are therefore to be considered in all respects as illustrative and not restrictive, the scope of the invention being indicated by the appended claims, and all changes that come within the meaning and range of equivalency of the claims are therefore intended to be embraced therein.

We claim:

1. A recording medium including recorded data, comprising:
   a first region for a main data; and
   a second region for copy protection information for use in decrypting the main data, wherein said second region includes a plurality of data units including first data unit and subsequent data units, the first data unit including data encoded in straight type and subsequent data units including data encoded in straight type and data encoded in wobbled type respectively, the subsequent data units having said copy protection information, and
   wherein the first data unit includes sync data portion and frame data portion encoded in straight type respectively, and each subsequent data unit includes sync data portion encoded in straight type and frame data portion encoded in straight type and wobbled type.

2. The recording medium according to claim 1, wherein the data portion encoded in wobbled type comprises said copy protection information, said copy protection information being a decryption key for decrypting encrypted main data.

3. The recording medium according to claim 1, wherein said copy protection information is comprised of data bit "0" and data bit "1" encoded by a predetermined period, and wherein each data bit is distinguished from each other by a transition direction within the predetermined period.

4. The recording medium according to claim 3, wherein the predetermined period is 66T or 68T and a length of the straight type in the frame data portion of each subsequent data unit is determined depending on the predetermined period.

5. A method of reproducing data from a recording medium, comprising:
   detecting copy protection information for use in decrypting a main data from second region of the recording medium, to reproduce the main data recorded on first region of the recording medium, wherein said second region includes a plurality of data units including first data unit and subsequent data units, the first data unit including data encoded in straight type and subsequent data units including data encoded in straight type and data encoded in wobbled type respectively, the subsequent data units having said copy protection information, and
   wherein the first data unit includes sync data portion and frame data portion encoded in straight type respectively, and each subsequent data unit includes sync data portion encoded in straight type and frame data portion encoded in straight type and wobbled type; and
   controlling a decryption of the main data recorded on the first region based on the detected copy protection information.

6. A method according to claim 5, wherein said detecting includes detecting a frame sync signal indicative of the start of a each subsequent data unit, the frame sync signal being included in the sync data portion.

7. A method according to claim 6, wherein said detecting of the copy protection information occurs a fixed period after the frame sync signal is available.

8. A method according to claim 5, wherein said detecting of the copy protection information includes integrating a push-pull signal created by a difference between beams reflected to a photo detector and producing each data bit based on the integrated value.

9. A method according to claim 8, wherein said integrating is performed for a fixed period after detection of a frame sync signal.

10. A method according to claim 8, wherein said integrating samples the push-pull signal and adds the sampled values such that for half a prescribed integration time interval, sampled values are added and for half a prescribed integration time interval, sampled values are added with sign inversion.

11. A method according to claim 5, wherein said detecting of the copy protection information includes determining one of data bit "0" and "1" based on an integrated value.

12. A method according to claim 11, wherein said determining includes outputting a valid bit value if an absolute value of the integrated value exceeds a threshold level.

13. A method of recording data on a recording medium, comprising:

generating a copy protection information for use in decrypting a main data;

encoding a plurality of data units including first data unit and subsequent data units, the copy protection information being included in the subsequent data units, wherein the first data unit is encoded in straight type and the subsequent data units include a first portion encoded in straight type and a second portion having said copy protection information encoded in wobbled type respectively, the first portion including sync data and a predetermined portion followed by the second portion encoded in the wobbled type; and recording the copy protection information on an specific area of the recording medium.

14. A method according to claim 13, wherein the copy protection information is generated as a decryption key and the copy protection information is comprised of data bit "0" and data bit "1" encoded by a predetermined period, and wherein each data bit is distinguished from each other by a transition direction within the predetermined period.

15. A method according to claim 14, wherein the predetermined period is 66T or 68T and a length of the straight type in the predetermined portion of each subsequent data unit is determined depending on the predetermined period.

16. An apparatus for reproducing data from a recording medium, comprising:

a detector configured to detect a copy protection information recorded on second region of the recording medium to reproduce a main data recorded on first region of the recording medium, wherein said second region includes a plurality of data units including first data unit and subsequent data units, the first data unit including data encoded in straight type and subsequent data units including data encoded in straight type and data encoded in wobbled type respectively, the subsequent data units having said copy protection information, and wherein the first data unit includes sync data portion and frame data portion encoded in straight type respectively, and each subsequent data unit includes sync data portion encoded in straight type and frame data portion encoded in straight type and wobbled type; and a signal processor configured to decrypt the main data by utilizing the copy protection information detected from the detector.

17. The apparatus according to claim 16, wherein said detector includes a frame sync detector configured to detect a frame sync signal from the sync data portion and a filter configured to filter a push-pull signal.

18. The apparatus according to claim 16, wherein said detector further includes an integrator configured to integrate the filtered push-pull signal output from the filter, in accordance with a reference timing signal, the reference timing signal being generated from a timing generator.

19. The apparatus according to claim 18, wherein said detector further includes a bit detector configured to detect data bit "0" or "1" in accordance with an integrated value from the integrator.

* * * * *

UNITED STATES PATENT AND TRADEMARK OFFICE
CERTIFICATE OF CORRECTION

PATENT NO. : 7,561,496 B2 Page 1 of 1
APPLICATION NO. : 10/849050
DATED : July 14, 2009
INVENTOR(S) : Jin Yong Kim et al.

It is certified that error appears in the above-identified patent and that said Letters Patent is hereby corrected as shown below:

Title page, item (30) should read

--(30)    Foreign Application Priority Data

May 20, 2003    (KR)    10-2003-0031912--

Signed and Sealed this

Eighteenth Day of August, 2009

David J. Kappos
*Director of the United States Patent and Trademark Office*